Nov. 20, 1962

G. POPOVICH ET AL 3,064,493

TRANSMISSION CONTROL LINKAGE

Filed Oct. 1, 1959

INVENTORS
George Popovich
BY & Virgil W. Owen

A. M. Heiter

ATTORNEY

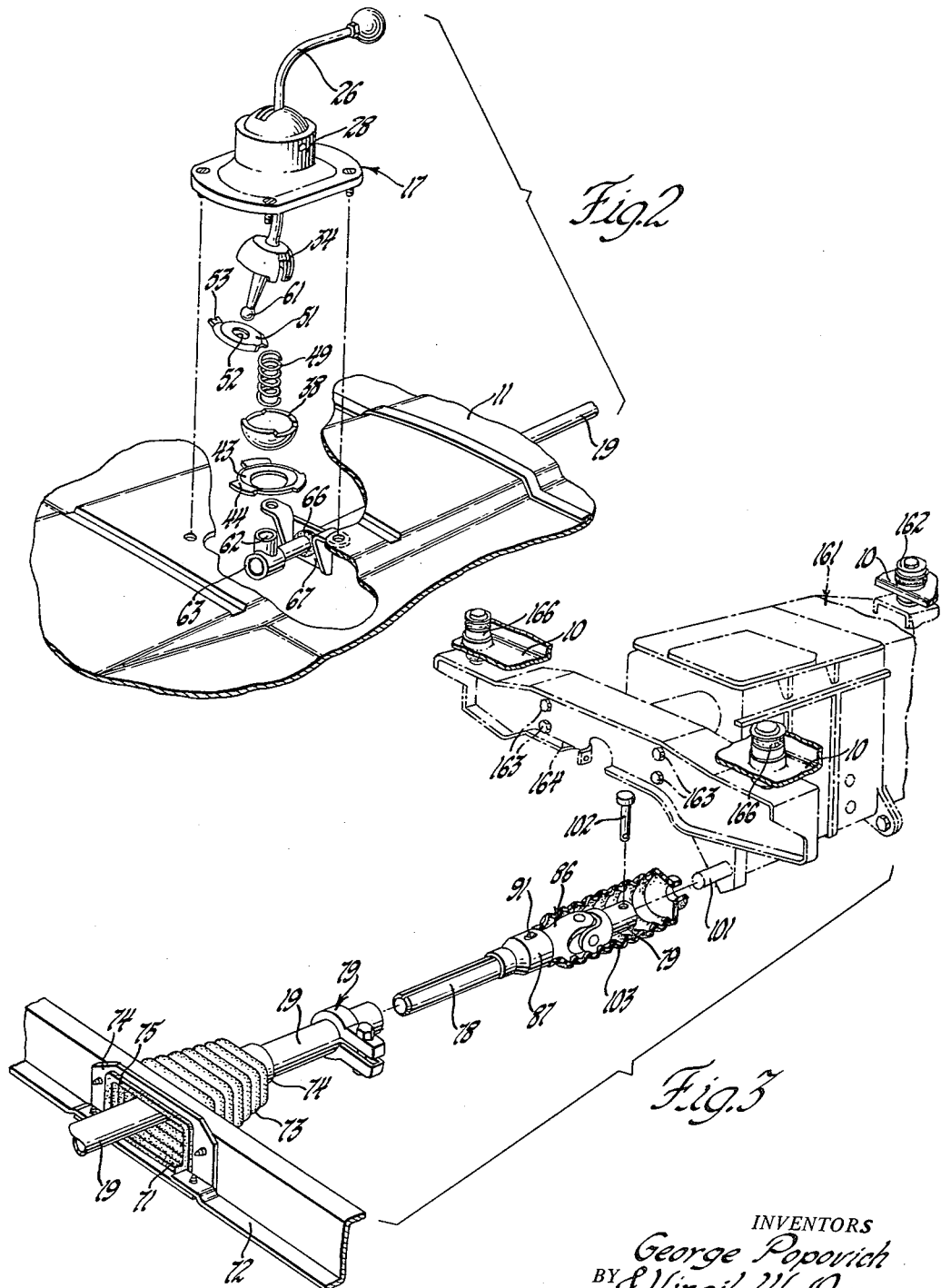

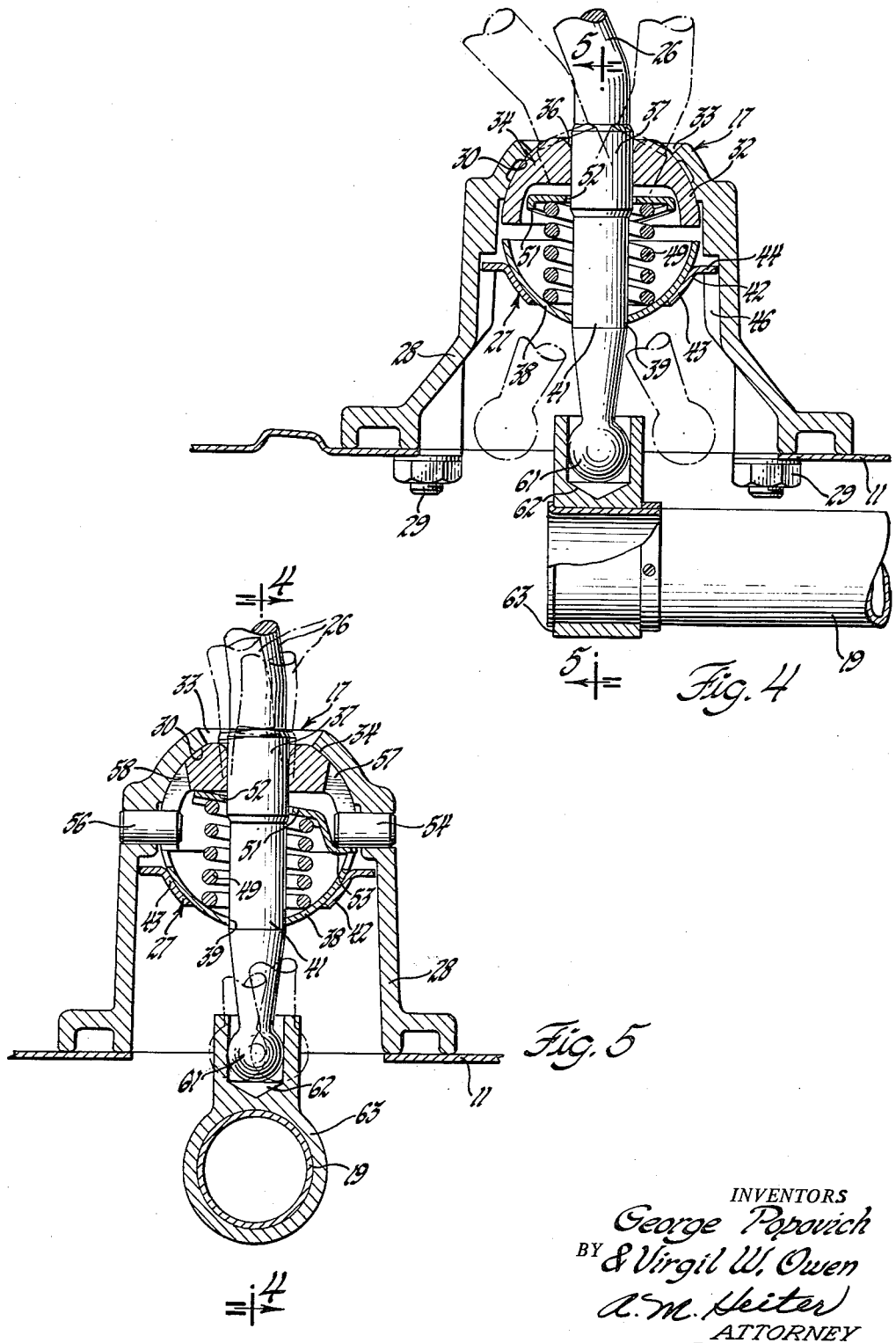

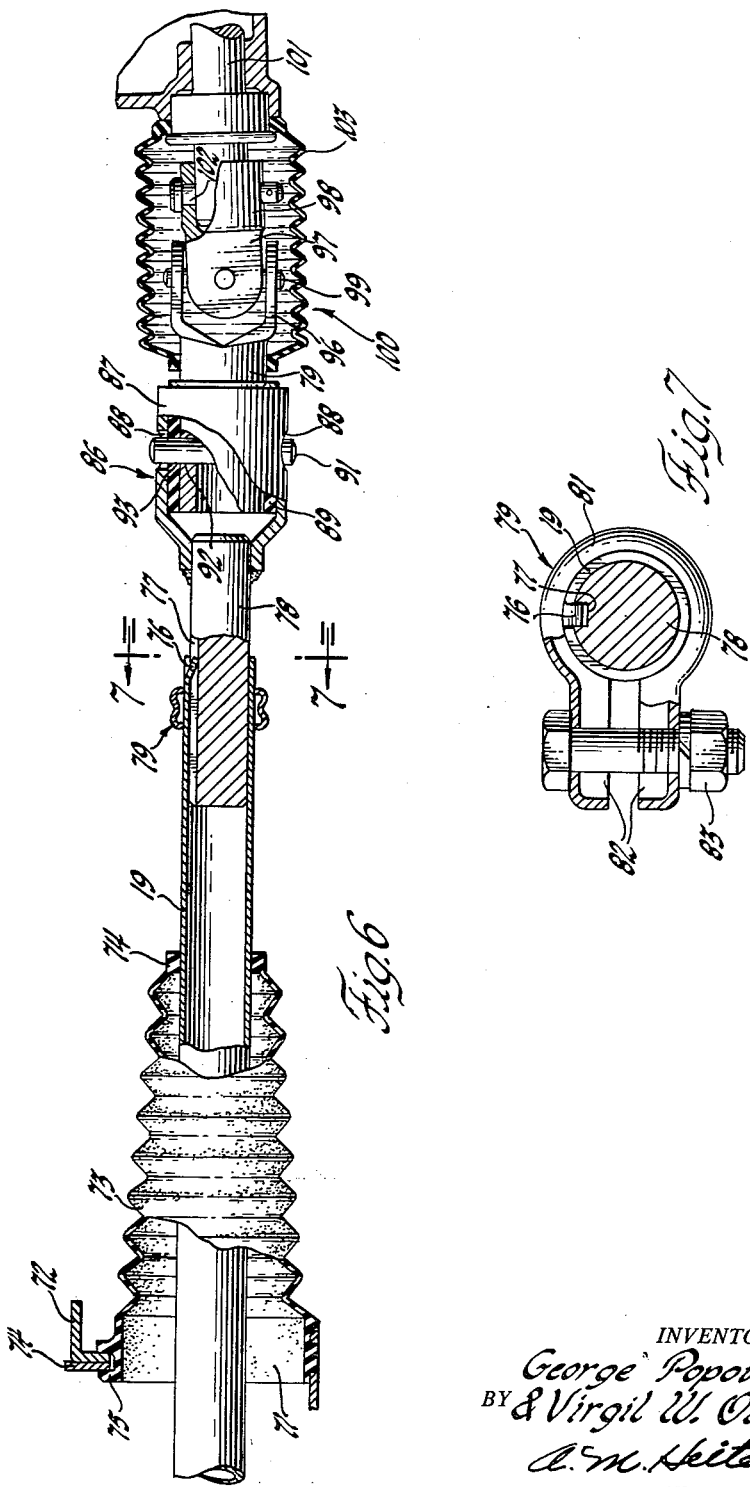

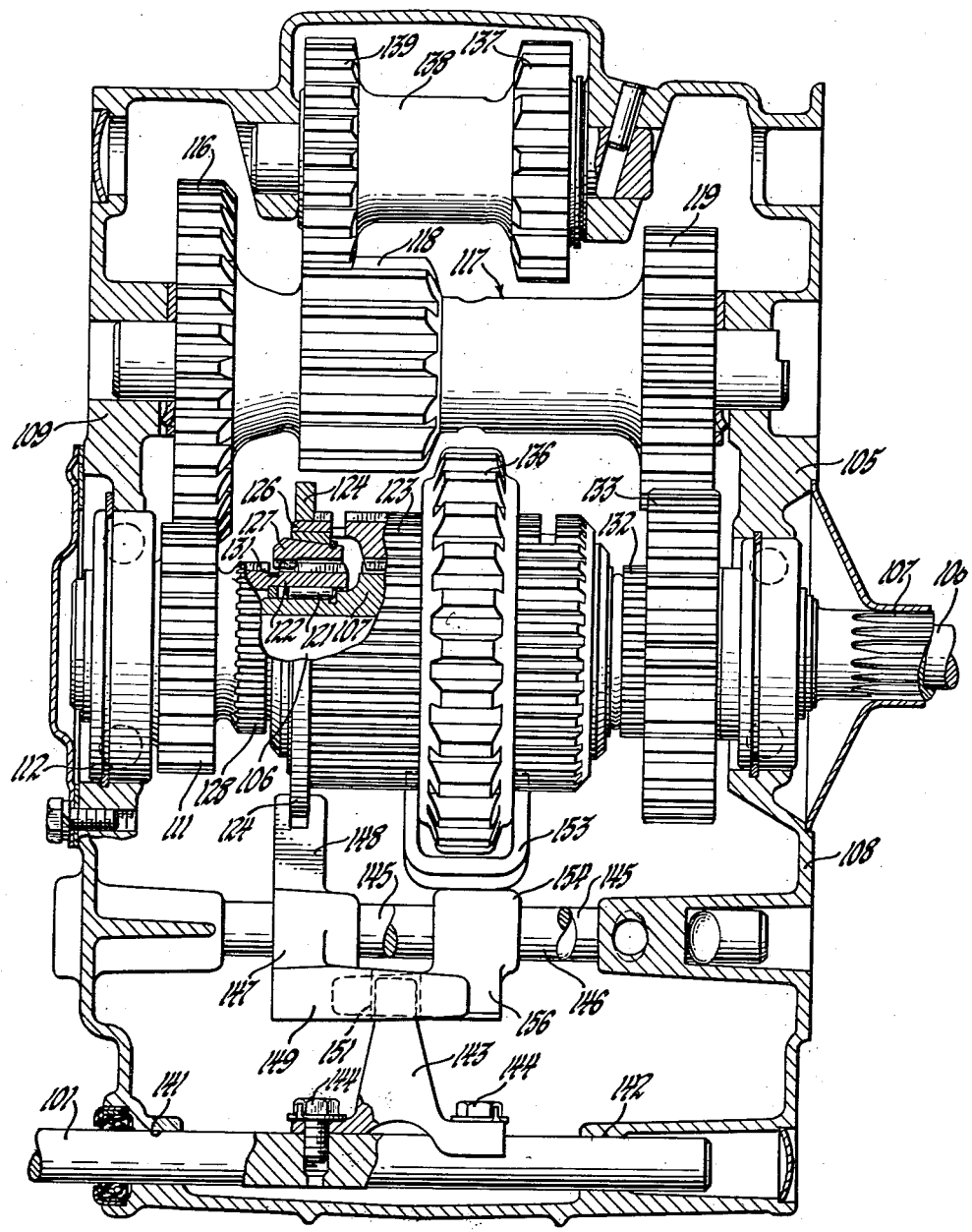

United States Patent Office 3,064,493
Patented Nov. 20, 1962

3,064,493
TRANSMISSION CONTROL LINKAGE
George Popovich, Birmingham, and Virgil W. Owen, Royal Oak, Mich., assignors to General Motors Corporation, Detroit, Mich., a corporation of Delaware
Filed Oct. 1, 1959, Ser. No. 843,862
16 Claims. (Cl. 74—473)

This invention relates to a vehicle having a transmission control system and more particularly to a remote control linkage for a transmission.

In vehicles having the transmission located at the rear of the vehicle and the transmission control lever located forward in the driver's compartment, it is proposed to connect the transmission lever by a single control rod extending directly into the transmission. The transmission control lever is secured to a ball mounted in a socket on the vehicle to permit universal movement. The ball is retained in contact with the socket and at one side of its selecting movement by a single spring. The rod connecting the lever to the transmission is only supported on the vehicle adjacent the gear shift lever. The rod has an axial adjustment and a universal joint to accommodate initial variations in the position of the transmission and movement of the transmission during operation. The rod is rotated to select either one of two rails of the transmission and reciprocated to reciprocate the selected rail to shift the transmission.

An object of the invention is to provide in an automotive vehicle having a transmission located at the rear of the vehicle and a transmission control lever located in the forward portion of the vehicle, a single rod connecting the control lever to the transmission having a bearing support only adjacent the control lever.

Another object of the invention is to provide in a gear shift lever pivotally mounted on a universal joint, a universal joint having a ball consisting of two parts and a cam mechanism and a spring operative to maintain the two parts to the ball in contact with the cooperating socket and to actuate the cam mechanism to maintain the gear shift lever in one cross shift or selecting position.

Another object of the invention is to provide in a universal mounting for a gear shift control lever universally supported by a ball mounted in a socket, a two-part ball and a cam mechanism having a spring operative to maintain the two-part ball in contact with the socket and to actuate the cam mechanism to maintain the gear shift lever in one of the cross shift positions and additional cooperating cam means to prevent rotation of the ball in the socket.

Another object of the invention is to provide in a gear shift control mechanism for a transmission located at the rear of the vehicle and a gear shift lever at the front of the vehicle, a single rod control supported only adjacent the gear shift lever and directly connected by an axial adjustment, a vibration damper and a universal joint to a coaxial rod in the transmission.

These and other objects of the invention will be more apparent from the following description and drawing of a preferred embodiment of the invention.

FIG. 2 is an expanded perspective view of the transmission control lever showing the connecting rod of this transmission control system.

FIG. 3 is an expanded perspective view of the rear portion of the transmission control linkage and the transmission.

FIG. 4 is a section on the line 4—4 of FIG. 5 showing the transmission control lever support and connecting rod.

FIG. 5 is a transverse section taken on the line 5—5 of FIG. 4 showing the transmission control lever and connecting rod.

FIG. 6 is a view of the rear portion of the transmission control linkage with parts in section to show details.

FIG. 7 is a section of FIG. 6 on the line 7—7.

FIG. 8 is a sectional view of the transmission housing taken on the line 8—8 of FIG. 9.

FIG. 9 is a diagrammatic sectional view illustrating the relative location of the transmission shafts and gearing.

Figure 1:
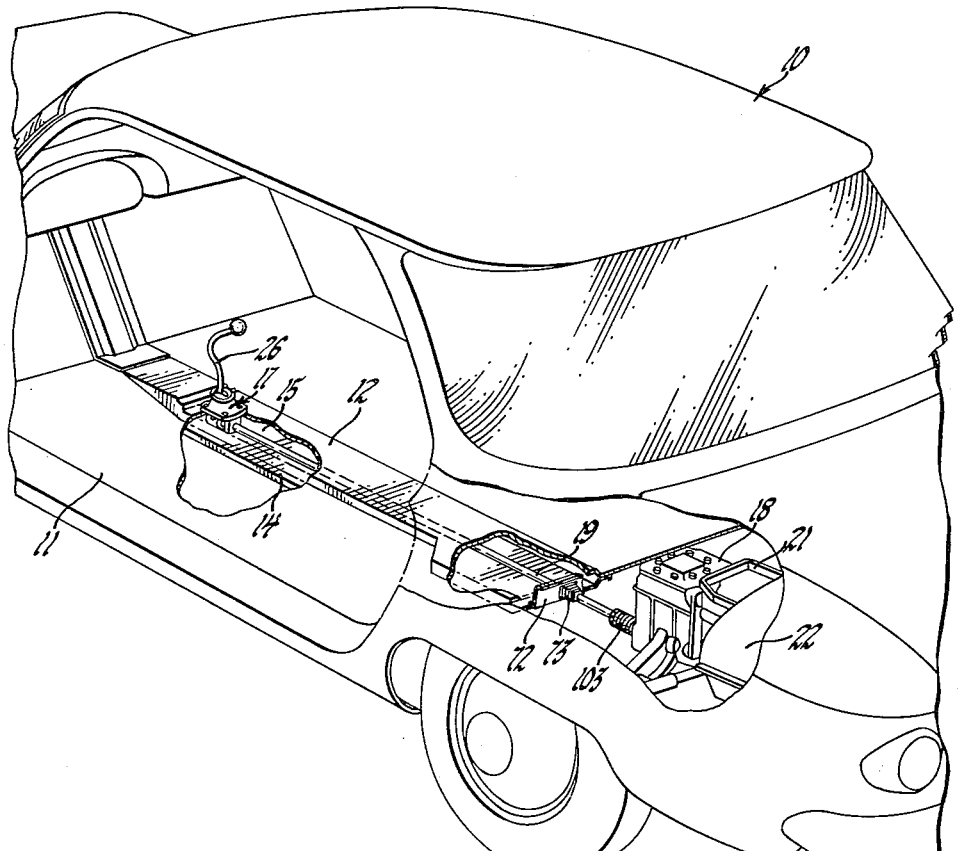
FIG. 1 illustrates the complete transmission control system mounted in the vehicle.

The transmission control system made in accordance with this invention is primarily intended for use in a vehicle 10 having a unit body construction having a floor 11 which may be flat or have a small raised central portion 12 extending longitudinally of the floor. A flanged panel 14 is attached to the underside of the floor to provide a tunnel 15 extending longitudinally of the vehicle from the driver's compartment in the forward portion of the vehicle where the gear shift lever mechanism 17 is located to the rear of the vehicle adjacent the transmission 18. The gear shift lever is connected by a rod 19 to the transmission 18 as explained in further detail below. The transmission 18 is a part of the unitary assembly consisting of the transmission 18, a differential 21, and an engine 22, as shown in further detail in application S.N. 843,681 (B-29,277), filed October 1, 1959, by George Popovich. This assembly is mounted on the vehicle 10 as shown in detail in application S.N. 843,717 (B-29,025), filed October 1, 1959 by Kai H. Hansen, now Patent No. 2,988,162 issued June 13, 1961.

The transmission or gear shift control lever assembly 17, referring to FIGS. 2, 4 and 5, has a control lever 26 pivotally mounted in a universal joint 27 and connected to the control rod 19 to reciprocate control rod 19 in response to fore and aft or longitudinal movement of the lever and to rotate control rod 19 in response to transverse movement of the lever. The universal joint 27 consists of a support portion 28 secured to the floor 11 by bolts 29. The support 28 has adjacent its upper end a spherical seat portion 30 consisting of a pair of annular ribs 32 having the surface of annular segments of a sphere and having a central aperture 33 to receive the gear shift lever 26. The upper semi-spherical portion 34 of the ball has a central aperture 36 which is press-fitted and thus secured on an enlargement 37 of the lever 26. The outer spherical surface of the upper half 34 of the ball engages the spherical seat surfaces 32 for universal movement. The lower portion of the ball is formed by a stamped semi-spherical member 38 having an aperture 39 which receives the lower portion 41 of the lever 26 and slides on the lever. The lower portion of the socket is formed by a stamped member 42 having a spherical seat portion 43 and a plurality of spaced bayonet lugs 44 which in the assembled position shown rest on cooperating bayonet lugs 46 formed on the inside of the surface of the support 28. The member 42 is inserted with the lugs 44 passing through the recesses between lugs 46 and turned to the locking positions. The ball joint 27 is held in the assembled position shown with the upper and lower ball members 34 and 42 resiliently biased to engage the spherical seat portions 32 and 43 by a spring 49 which engages the lower ball member 38 and which, through a washer 51, always engages the upper ball member. The cam member 51 has a central aperture 52 through which the lever 26 passes to permit free tilting movement of the member 51 relative to the lever and at one side a downwardly and radially outwardly extending cam lug 53 as best shown in FIG. 5 which engages a pin 54 secured in an aperture in the housing 28 and extending through slot 57 to the interior of the hollow upper ball. The cam 53 operates in conjunction with the pin or cam member 54 to bias the shift lever 26 to the second reverse position. The pin 54 and a pin 56 cooperate with vertical slots 57 and 58 in the ball member 34 to prevent rotation about a vertical axis of the ball relative to the ball socket. The lower end 41 of the lever 26 terminates in a ball 61 which fits into a socket 62 of the bracket 63 secured to the control tube 19.

The control tube 19 is rotatably supported as shown in FIG. 2 by a nylon bushing 66 secured to a bearing bracket 67 which is mounted on the underside of the floor 11 by the rear bolts 29 which also secure the bracket 28 to the floor 11 and located within the tunnel 15 to provide the only support directly on the vehicle body for the control tube 19.

The control tube extends through the tunnel 15 and through an aperture 71 in a rear support member 72 which provides a closure for the rear end of the tunnel 15. A boot or corrugated flexible member 73, FIGS. 2 and 6, has a collar 74 tightly fitting the tube rod 19 and is secured and sealed by a grooved collar 75 within an aperture in the frame 74 to provide a dirt seal at the rear end of the tunnel 15.

To provide an axial adjustment, the control rod 19 which is preferably tubular has a pair of closely adjacent slots adjacent the end with an intermediate portion or tab 76 bent downwardly and fitting within an axial spline 77 in the connecting rod 78. A clamp 79 consisting of a circular channel-shaped portion 81 surrounds tube 19 and has hollow box-like ears 82 at each end cooperating with a clamping bolt 83. The clamp is located around the tubular rod 19 to clamp the tube 19 to the adjustable rod 78.

A vibration damper 86 connects the adjustable rod 78 to the connecting rod 79. The damper 86 consists of a sleeve 87 suitably secured to the rod 78 and having diametrically opposed apertures 88. A rubber sleeve 89 is located within the sleeve 87. The rod 79 is press-fitted within the steel and rubber sleeves 87 and 89 to provide a driving connection. Though a press fit will preload the rubber to provide a drive, it will be appreciated that the rubber may be bonded to the steel sleeves. In order to prevent complete failure on deterioration of the rubber sleeve 89, a pin 91 smaller in diameter than the holes 88 is press-fitted in a bore 92 extending through the rod 79 and through the holes 93 in the rubber. During normal operation the drive is transmitted through rubber sleeve 89 between the sleeve 87 and rod 79 but on deterioration of the rubber the drive will be transmitted by the pin 91.

The rod 79 has as its other end a pair of ears 96 cooperating with a pair of ears 97 on the connector rod 98. The ears 96 and 97 are suitably apertured to receive the spider member 99 which has a pair of opposed aligned shaft members fitting in the apertures in the opposed ears 96 and at right angles thereto another pair of oppositely extending shaft members fitting the apertures in the ears 97 to provide a universal point 100 connecting rod 79 to member 98. The member 98 is hollow and fits over the transmission control rod 101 and is secured thereto by a bolt or pin 102 passing through suitably aligned apertures in these members. The universal joint 103 and this connection is kept clean by a flexible boot 103 having suitable collars at opposite ends in sealing engagement with a portion of the transmission housing and the rod 79.

The transmission shown in FIG. 8 provides gearing for three forward speeds and reverse mounted in a housing 105. The input shaft 106 is mounted within the output sleeve shaft 107, which is supported by a bearing on wall 108, extends to the opposite wall 109 of the transmission and is connected by suitable splines to the input gear 111 which is rotatably mounted by the bearing 112 supported in the front wall 109. The input gear 111 drives the countershaft input gear 116 of the countershaft gear cluster 117 which is rotatably mounted by suitable bearings in the transmission walls 108 and 109. The cluster 117 also has a first speed gear 118 and a second speed gear 119. The output sleeve shaft 107 surrounds the input shaft 106 and is alsorotatably supported by bearing 121 and another not shown within the extension 122 of the input gear 111. The sliding collar 123 is splined for axial movement on the output shaft 107. The shift collar 124 and the outer synchromesh friction ring 126 are secured to collar 123. The inner synchromesh ring 127 is mounted for axial sliding movement on splines 128 on the extension 122 of gear 111. This conventional synchromesh arrangement functions to engage direct drive or third ratio when the collar 123 is moved to the left as viewed in FIG. 8 so that synchronizer ring 126 engages synchronizer ring 127 to initiate synchronization, the ring 127 being retarded by the annular detent spring 131. Then the internal splines of collar 123 engage splines 128 for direct drive. The same type of synchronizing arrangement though not shown is employed in the second speed drive. When the collar 123 is moved to the right, the internal splines of collar 123 engage the splines 132 of the second speed output gear 133 so that the second speed drive from gear 119 to 133 is connected through the collar 123 to the output shaft 107. First speed drive is provided when the first reverse gear 136 which is splined for axial movement to the external splines on the collar 123 is moved to the left to engage the first speed cluster gear 108. Thus, the first speed drive is transmitted from first speed gear 108 to gear 136 through the splines to the collar 123 and the output shaft 107. For reverse drive the gear 136 is moved to the right to engage the reverse gear 137 which is mounted on the reverse gear shaft 138 suitably supported for rotation in the housing and driven by the reverse input gear 139 which is in constant mesh with the first speed cluster gear 118.

The transmission control rod 101 is rotatably and reciprocably mounted in bores 141 and 142 located in opposite ends of the transmission housing. A fork 143 is secured by suitable means such as bolts 144 to the rod 101. A pair of reciprocable rails, a second third rail 145 and a first reverse rail 146 support the shift forks. The second third rail 145 has fixed thereon a bracket 147 having a fork 148 engaging the ring 124 and a lug 149 having a recess 151 to receive the finger 143. The first reverse gear 136 is longitudinally moved by a fork 153 which is secured to a bracket 154 secured to the first reverse shift rail 146 which is similar to the shift rail 146 and mounted in the same way. The bracket 154 has a projection 156 lying along side and behind the projection 149 and has a slot facing slot 151. Thus, with the transmission in neutral, on rotation of shaft 101 finger 143 may be rotated to engage either the slot 151 and bracket 147 for actuating the second third shift rail or the slot and bracket 156 for actuating the first reverse shift rail so as to respectively move the collar 123 to second or third ratios or the gear 146 to provide first or reverse drive.

The engine differential and transmission unit is mounted at the rear of the unit and the engine on a single centrally located cushion mounting 162 secured to the vehicle body 10. At the front the transmission and the unit are secured by bolts 163 and threaded bosses 167 on the transmission housing to a cross member 164 secured by a pair of cushion mountings 166 to the body 10. This arrangement which provides a three-point engine mounting has a long longitudinal distance between the fore and aft motor mounts to obtain better vibration dampening for the unit 161 which includes the engine. The complete details of this mounting are shown in application S.N. 843,717 (B-29,025). The cross member 164 is secured to the lower portion of the front face of the transmission housing 105. Thus, the shaft 101 is located parallel with and closer to the axis of the vibration damping movement of the unit 161 permitted by the cushion mounting so that this movement only moves the rod 101 less than the movement at cushions 166 and thus does not interefere with the operation of the transmission control linkage.

It will be appreciated that the above described preferred embodiment of the invention may be modified within the terms of the appended claims.

We claim:

1. In a vehicle having a floor, a multiratio transmission located at the rear of the vehicle, a support bracket mounted on the floor of the vehicle at the forward end of the vehicle having a universal pivot support, a control lever universally mounted in said universal pivot support and having a lower end extending below said floor, a control rod located below said floor and extending from said support bracket substantially directly into the lower portion of said transmission housing, said support bracket having bearing means below said floor providing in conjunction with said transmission housing the only support for said control rod, means connecting said lower end of said control lever to said control rod to rotate and reciprocate said control rod, and means within said transmission responsive to the rotation and reciprocation of said control rod to change the gear ratio of said multiratio transmission.

2. In a vehicle having a floor, a tunnel extending beneath the floor substantially for the length of the vehicle, a multiratio transmission located at the rear of the vehicle at the outlet of said tunnel mounted on an anti-vibration support permitting rotary movement to damp vibrations about an axis, a support bracket mounted on the top of said floor over the forward end of said tunnel having a universal pivot support, a control lever universally mounted in said universal pivot support and having a lower end extending into said tunnel, a control rod extending through said tunnel and substantially directly into said transmission housing closely parallel to said axis, said support having bearing means within said tunnel below said floor providing the only support for said control rod in addition to said transmission housing, means connecting said lower end of said control lever to said control rod to rotate and reciprocate said control rod, means within said transmission responsive to the rotation and reciprocation of said control rod to change the gear ratio of said multiratio transmission.

3. In a vehicle having a body with a floor, a tunnel extending beneath the floor substantially for the length of the vehicle, a unit including an engine, a differential drive and multiratio transmission, said multiratio transmission being located at the rear of the vehicle at the outlet of said tunnel, said unit being mounted on said body by an anti-vibration support permitting rotary movement to damp vibrations about an axis closely parallel with said axis of rotation of said transmission, a support bracket mounted on the top of said floor over the forward end of said tunnel having a universal pivot support, a control lever universally mounted in said universal pivot support and having a lower end extending into said tunnel, a control rod extending through said tunnel and substantially directly into said transmission housing, said support having bearing means within said tunnel below said support providing the only support for said control rod in addition to said transmission, means connecting said lower end of said control lever to said control rod to rotate and reciprocate said control rod, means within said transmission responsive to the rotation and reciprocation of said control rod to change the gear ratio of said multiratio transmission.

4. In a vehicle having a floor, a tunnel extending beneath the floor substantially for the length of the vehicle, a multiratio transmission located at the rear of the vehicle at the outlet of said tunnel, a support bracket mounted on the top of said floor over the forward end of said tunnel having a universal pivot support, a control lever universally mounted in said universal pivot support and having a lower end extending into said tunnel, a control rod extending through said tunnel and having an axial adjustment, a vibration damper and a universal joint and a portion substantially coaxially pivotally mounted with respect to the other portions of said control rod rotatably mounted in said transmission housing, said support having bearing means within said tunnel below said support providing the only support for said control rod, means connecting said lower end of said control lever to said control rod to rotate and reciprocate said control rod, means within said transmission responsive to the rotation and reciprocation of said control rod to change the gear ratio of said multiratio transmission.

5. The invention defined in claim 4 and said transmission being mounted on an anti-vibration mounting providing for damping movement about an axis closely parallel with said control rod.

6. In a vehicle having a floor, a tunnel extending beneath the floor substantially for the length of the vehicle, a multiratio transmission located at the rear of the vehicle at the outlet of said tunnel, a support bracket mounted on the top of said floor over the forward end of said tunnel having a universal pivot support, a control lever universally mounted in said universal pivot support and having a lower end extending into said tunnel, a control rod extending through said tunnel and substantially directly into said transmission housing, said support having bearing means within said tunnel below said support providing the forward support for said control rod, means connecting said lower end of said control lever to said control rod to rotate and reciprocate said control rod, a controlled rod within said transmission coaxially aligned with said control rod and connected to said control rod to transmit rotary and reciprocation force and to support said control rod at the only point of support in addition to said forward support, and means actuated by said controlled rod responsive to the rotation and reciprocation of said control rod to change the gear ratio of said multiratio transmission.

7. In a transmission control linkage, a support having an opening through a portion of the support with spherical seat portions, a two-part substantially spherical hollow ball rotatably mounted on said seat portions, a gear shift lever fixed to one of said ball parts, the other part being movably mounted relative to said one part, an aperture in said ball, a cam member fixed to said support and extending through said aperture and in said hollow ball, a cam member located inside said hollow ball, spring means operatively engaging said parts of said two-part ball to resiliently bias said parts into engagement with said seats and to bias said cam member to urge said ball and gear shift lever to a predetermined position.

8. In a transmission control linkage, a support having an opening through a portion of the support with spherical seat portions, a two-part substantially spherical hollow ball rotatably mounted on said seat portions, a gear shift lever fixed to one of said ball parts, the other part being movably mounted relative to said one part, an aperture in said ball, a cam member fixed to said support and extending through said aperture and in said hollow ball and including means to prevent rotation of said ball about the longitudinal axis of said lever, a cam member located inside said hollow ball, spring means operatively engaging said parts of said two-part ball to resiliently bias said parts into engagement with said seats and to bias said cam member to urge said ball and gear shift lever to a predetermined position.

9. In a transmission control linkage, a support having an opening through a portion of the support having seat portions within the opening, a two-part hollow universal pivot member having surface portions engaging said seat portions to universally pivotally mount said pivot member on said support, a gear shift lever fixed to one of said parts, the other part being movably mounted relative to the other part, an opening between the surface portions of said pivot member, a cam member fixed to said support, a cam member located inside said hollow pivot member, said cam members cooperating through said opening, spring means operatively engaging said parts of said two-part pivot member to resiliently bias said parts into engagement with said seats and to bias said cam member to urge said pivot member and gear shift lever to a predetermined position.

10. In a transmission control linkage, a support having an opening through a portion of the support having seat portions within said opening, a two-part universal pivot member having surface portions engaging said seat portions to universally pivotally mount said pivot member on said support, a gear shift lever fixed to one of said parts, the other part being movably mounted relative to the other part, a cam member fixed to said support, a cam member located on said pivot member, said cam members cooperating with each other, spring means operatively engaging said parts of said two-part pivot member to resiliently bias said parts into engagement with said seas and to bias said cam member to urge said pivot member and gear shift lever to a predetermined position.

11. In a transmission control linkage, a support having a downwardly facing upper semi-spherical bearing seat, the upper portion of said support being apertured substantially at the center of said upper bearing seat, a control lever extending through said aperture and within said hollow support and having fixed thereto an upper semi-spherical ball member engaging said upper bearing seat, a lower semi-spherical ball member having a central seat, aperture movably mounted on said control lever, a lower semi-spherical bearing seat engaging said lower semi-spherical ball member, said lower spherical bearing seat having bayonet means securing it within said hollow support, a pair of vertical slots in diametrically opposed sides of said upper semi-spherical ball member, a pair of diametrically opposed pins fixed to said support and each extending into one of said slots to prevent rotation of said control lever about the longitudinal axis, spring means located between said lower semi-spherical ball member and said upper semi-spherical ball member to resiliently bias said semi-spherical ball members into contact with said upper and lower bearing seats.

12. In a transmission control linkage, a support having a downwardly facing upper semi-spherical bearing seat, the upper portion of said support being apertured substantially at the center of said upper bearing seat, a control lever extending through said aperture and within said hollow support and having fixed thereto an upper semi-spherical ball member engaging said upper bearing seat, a lower semi-spherical ball member having a central aperture movably mounted on said control lever, a lower semi-spherical bearing seat engaging said lower semi-spherical ball member, said lower spherical bearing seat having bayonet means securing it within said hollow support, a cam member fixed to said support, an anular member located around said gear shift lever engaging said upper semi-spherical ball member internally and having a cam portion engaging said cam member, spring means located between said lower semi-spherical ball member and said annular member to resiliently bias said control lever transversely to one side.

13. In a transmission control linkage, a support having a downwardly facing upper semi-spherical bearing seat, the upper portion of said support being apertured substantially at the center of said upper bearing seat, a control lever extending through said aperture and within said hollow support and having fixed thereto an upper semi-spherical ball member engaging said upper bearing seat, a lower semi-spherical ball member having a central aperture movably mounted on said control lever, a lower semi-spherical bearing seat engaging said lower semi-spherical ball member, said lower spherical bearing seat having bayonet means securing it within said hollow support, a cam member fixed to said support, an annular member located around said gear shift lever engaging said upper semi-spherical ball member internally and having a cam portion engaging said cam member, spring means located between said lower semi-spherical ball member and said annular member to resiliently bias said semi-spherical ball members into contact with said upper and lower bearing seats and to bias said control lever transversely to one side.

14. In a transmission control linkage, a support having a downwardly facing upper semi-spherical bearing seat, the upper portion of said support being apertured substantially at the center of said upper bearing seat, a control lever extending through said aperture and within said hollow support and having fixed thereto an upper semi-spherical ball member engaging said upper bearing seat, a lower semi-spherical ball member having a central aperture movably mounted on said control lever, a lower semi-spherical bearing seat engaging said lower semi-spherical ball member, said lower spherical bearing seat having bayonet means securing it within said hollow support, a pair of vertical slots extending through diametrically opposed sides of said upper semi-spherical ball member, a pair of diametrically opposed pins fixed to said support and each extending into one of said slots to prevent rotation of said control lever about the longitudinal axis, an annular member located around said gear shift lever engaging said upper semi-spherical ball member internally and having a cam portion engaging one of said pins, spring means located between said lower semi-spherical ball member and said annular member to resiliently bias said semi-spherical ball members into contact with said upper and lower bearing seats and to bias said control lever transversely to one side.

15. In a transmission control linkage, a support having a downwardly facing upper semi-spherical bearing seat, the upper portion of said support being apertured substantially at the center of said upper bearing seat, a control lever extending through said aperture and within said hollow support and having fixed thereto an upper hollow semi-spherical ball member engaging said upper bearing seat, a lower hollow semi-spherical ball member having a central aperture movably mounted on said control lever, a lower semi-spherical bearing seat engaging said lower semi-spherical ball, said lower spherical bearing seat having bayonet means securing it within said hollow support, a pair of vertical slots extending through diametrically opposed sides of said upper spherical ball member, a pair of diametrically opposed pins fixed to said support and each extending into one of said slots to prevent rotation of said control lever about a longitudinal axis, one of said pins extending into the central hollow of said upper semi-spherical ball member, an annular member located around said gear shift lever engaging said upper semi-spherical ball member internally and having a cam portion engaging said one of said pins, spring means located between said lower semi-spherical ball member and said annular member to resiliently bias said semi-spherical ball members into contact with said upper and lower bearing seats and to bias said control lever transversely to one side.

16. In a transmission control linkage, a support having an opening through a portion of the support with spherical seat portions, a substantially spherical hollow ball rotatably mounted on said seat portions, a gear shift lever fixed to said hollow ball, an aperture in said ball, a cam member fixed to said support and extending through said aperture and into said hollow ball, a cam member located inside said hollow ball, spring means operatively engaging the inside of said hollow ball and said cam member to bias said cam member to urge said ball and gear shift lever to a predetermined position.

References Cited in the file of this patent

UNITED STATES PATENTS

| | | | |
|---|---|---|---|
| 1,485,278 | Lancia | Feb. 26, | 1924 |
| 1,796,106 | Johnson | Mar. 10, | 1931 |
| 1,864,644 | Eckland et al. | June 28, | 1932 |
| 1,982,316 | MacKenzie | Nov. 27, | 1934 |
| 2,026,445 | Trott | Dec. 31, | 1935 |
| 2,137,337 | Gemmer | Nov. 22, | 1938 |
| 2,647,591 | Young | Aug. 4, | 1953 |
| 2,736,393 | O'Connor | Feb. 28, | 1956 |
| 2,764,260 | Fleischman | Sept. 25, | 1956 |
| 2,819,626 | Stump | Jan. 14, | 1958 |
| 2,951,393 | Schroeder et al. | Sept. 6, | 1960 |